(12) United States Patent
Meager

(10) Patent No.: US 12,296,665 B2
(45) Date of Patent: May 13, 2025

(54) HIGH EFFICIENCY ELECTRIC MOTOR

(71) Applicant: AZAK Inc., Driggs, ID (US)

(72) Inventor: Benjamin Meager, Felt, ID (US)

(73) Assignee: AZAK Inc., Driggs, ID (US)

( * ) Notice: Subject to any disclaimer, the term of this patent is extended or adjusted under 35 U.S.C. 154(b) by 0 days.

(21) Appl. No.: 17/886,210

(22) Filed: Aug. 11, 2022

(65) Prior Publication Data

US 2023/0046120 A1    Feb. 16, 2023

Related U.S. Application Data

(60) Provisional application No. 63/233,110, filed on Aug. 13, 2021.

(51) Int. Cl.
*B60T 17/02* (2006.01)
*B60K 1/00* (2006.01)
*B60L 50/60* (2019.01)

(52) U.S. Cl.
CPC ............. *B60K 1/00* (2013.01); *B60L 50/60* (2019.02)

(58) Field of Classification Search
CPC .................. B60K 1/00; B60L 50/60
See application file for complete search history.

(56) References Cited

U.S. PATENT DOCUMENTS

| | | | |
|---|---|---|---|
| 1,357,571 A | 11/1920 | Knepper | |
| 1,905,345 A | 4/1933 | Dandini | |
| 1,915,886 A | 6/1933 | Gutierrez | |
| 2,977,714 A | 4/1961 | Gibson | |
| 3,016,967 A | 1/1962 | Rehfeld | |
| 3,400,286 A | 9/1968 | Anastasio | |
| 3,661,212 A | 5/1972 | Johnson | |
| 3,667,156 A | 6/1972 | Tomiyama et al. | |
| 3,905,323 A | 9/1975 | Kacere | |
| 3,987,915 A | 10/1976 | Conner | |
| 4,096,919 A | 6/1978 | Thompson | |
| 4,102,542 A | 7/1978 | Pirre, Jr. et al. | |
| 4,501,569 A | 2/1985 | Clark, Jr. et al. | |
| 4,726,800 A | 2/1988 | Kobayashi | |
| 5,163,494 A | 11/1992 | MacNeil et al. | |
| 5,427,193 A | 6/1995 | Avakian | |
| 5,755,304 A | 5/1998 | Trigg et al. | |
| 5,878,829 A | 3/1999 | Kanno et al. | |

(Continued)

FOREIGN PATENT DOCUMENTS

| CN | 203496596 | 3/2014 |
|---|---|---|
| DE | 19634195 | 1/1998 |

(Continued)

OTHER PUBLICATIONS

"Servomotor," Wikipedia, last modified Dec. 2015, 5 pages [retrieved Jan. 21, 2016 from: en.wikipedia.org/wiki/Servomotor.

(Continued)

*Primary Examiner* — Jared Fureman
*Assistant Examiner* — Esayas G Yeshaw
(74) *Attorney, Agent, or Firm* — Sheridan Ross P.C.

(57) ABSTRACT

A system and a vehicle are described. An illustrative system includes a vacuum chamber and one or more components of a motor. The one or more components of the motor may be provided in the vacuum chamber and may be configured to move in a partial or complete vacuum created within the vacuum chamber.

20 Claims, 4 Drawing Sheets

(56) References Cited

U.S. PATENT DOCUMENTS

| | | | |
|---|---|---|---|
| 6,302,494 B1 | 10/2001 | DiMarco et al. | |
| 6,328,123 B1 | 12/2001 | Niemann et al. | |
| 6,585,490 B1 | 7/2003 | Gabrys et al. | |
| 7,011,171 B1 | 3/2006 | Poulter | |
| 7,198,280 B2 | 4/2007 | Hara | |
| 7,494,398 B2 | 2/2009 | Laurienzo | |
| 7,659,680 B1 | 2/2010 | McVickers | |
| 8,701,801 B2 | 4/2014 | Itou et al. | |
| 8,807,254 B2 | 8/2014 | Manus | |
| 9,457,647 B2 | 10/2016 | Meager | |
| 9,616,318 B2 | 4/2017 | Rogers | |
| 9,660,500 B2 | 5/2017 | Huang | |
| 9,919,200 B2 | 3/2018 | Mo | |
| 9,950,243 B2 | 4/2018 | Evans | |
| 9,950,703 B2 | 4/2018 | Lee et al. | |
| 10,065,693 B2 | 9/2018 | Meager | |
| 10,179,508 B2 | 1/2019 | Meager | |
| 10,543,874 B2 | 1/2020 | Meager | |
| 10,807,659 B2 | 10/2020 | Pikulski | |
| 10,814,211 B2 | 10/2020 | Pikulski | |
| 11,040,747 B2 | 6/2021 | Meager | |
| 11,583,754 B2 | 2/2023 | Pikulski | |
| 11,648,458 B2 | 5/2023 | Rogers | |
| 11,975,794 B2 | 5/2024 | Huang | |
| 2002/0011368 A1 | 1/2002 | Van Den Berg | |
| 2002/0170685 A1 | 11/2002 | Weik, III et al. | |
| 2003/0010551 A1 | 1/2003 | Shirazawa | |
| 2003/0213630 A1 | 11/2003 | Pyntikov et al. | |
| 2004/0092206 A1 | 5/2004 | Lynders et al. | |
| 2004/0210356 A1* | 10/2004 | Wilton | B60L 58/14 701/22 |
| 2005/0007553 A1 | 1/2005 | Romanoff et al. | |
| 2005/0023052 A1 | 2/2005 | Beck et al. | |
| 2005/0067207 A1 | 3/2005 | Radtke et al. | |
| 2007/0194640 A1 | 8/2007 | Saur et al. | |
| 2007/0199748 A1 | 8/2007 | Ross, VII et al. | |
| 2007/0256747 A1* | 11/2007 | Morris | F16K 31/047 137/625.65 |
| 2009/0032321 A1 | 2/2009 | Marsh et al. | |
| 2010/0139995 A1 | 6/2010 | Rudakevych | |
| 2010/0163323 A1 | 7/2010 | Pickholz | |
| 2011/0048830 A1 | 3/2011 | Radtke et al. | |
| 2011/0106339 A1 | 5/2011 | Phillips et al. | |
| 2011/0251935 A1 | 10/2011 | German et al. | |
| 2012/0068664 A1 | 3/2012 | Franzen et al. | |
| 2012/0302390 A1 | 11/2012 | Lemire-Elmore et al. | |
| 2013/0049498 A1 | 2/2013 | Boughtwood | |
| 2013/0153311 A1 | 6/2013 | Huntzinger | |
| 2014/0341329 A1 | 11/2014 | Goder et al. | |
| 2017/0008580 A1 | 1/2017 | Meager | |
| 2017/0025922 A1 | 1/2017 | Jian et al. | |
| 2017/0259675 A1 | 9/2017 | Gaffoglio et al. | |
| 2017/0274886 A1* | 9/2017 | Kreh | F16C 3/18 |
| 2018/0022208 A1 | 1/2018 | Calleija et al. | |
| 2018/0297654 A1 | 10/2018 | Meager | |
| 2019/0173399 A1 | 6/2019 | Lin et al. | |
| 2019/0225268 A1 | 7/2019 | Lavoie et al. | |
| 2019/0233035 A1 | 8/2019 | Meager | |
| 2019/0255701 A1 | 8/2019 | Blankespoor et al. | |
| 2020/0001698 A1* | 1/2020 | Jang | F16D 48/06 |
| 2020/0108659 A1 | 4/2020 | Downey et al. | |
| 2020/0177054 A1 | 6/2020 | Van Seventer et al. | |
| 2021/0023934 A1 | 1/2021 | Gillett | |
| 2021/0197903 A1 | 7/2021 | Meager | |
| 2021/0276644 A1 | 9/2021 | Meager | |
| 2022/0069667 A1* | 3/2022 | Liao | H02J 3/32 |
| 2022/0203758 A1 | 6/2022 | Meager | |
| 2022/0258532 A1 | 8/2022 | Meager | |
| 2023/0091087 A1* | 3/2023 | Park | H01F 41/02 156/378 |
| 2023/0331295 A1 | 10/2023 | Meager | |
| 2024/0017606 A1 | 1/2024 | Park | |
| 2024/0051640 A1 | 2/2024 | Chen | |
| 2024/0092159 A1 | 3/2024 | Cao | |
| 2024/0227537 A1 | 7/2024 | Tsunogawa | |

FOREIGN PATENT DOCUMENTS

| | | |
|---|---|---|
| DE | 102020207312 | 12/2021 |
| KR | 10-1004957 | 12/2010 |
| WO | WO 98/19875 | 5/1998 |
| WO | WO 01/28796 | 4/2001 |
| WO | WO 2010/077300 | 7/2010 |
| WO | WO 2016/119022 | 8/2016 |

OTHER PUBLICATIONS

International Preliminary Report on Patentability for International (PCT) Patent Application No. PCT/US2022/040226, dated Feb. 22, 2024 8 pages.

International Search Report and Written Opinion for International (PCT) Patent Application No. PCT/US22/40226, dated Nov. 3, 2022 10 pages.

* cited by examiner

HIGH EFFICIENCY ELECTRIC MOTOR

CROSS-REFERENCE TO RELATED APPLICATION

The present application claims the benefit of U.S. Provisional Patent Application No. 63/233,110, filed on Aug. 13, 2021, the entire contents of which are hereby incorporated herein by reference in its entirety.

FIELD

The present disclosure relates generally to the field of electric motors. More specifically, it relates to electric motors having one or more movable components provided in a vacuum chamber.

BACKGROUND

An important performance trait for electric vehicles (e.g., vehicles or objects that are moved under operation of one or more electric motors) is a distance that the vehicle can travel before exhausting its power supply(ies). Improvements in operational efficiencies of electric motors can translate directly to improvements in performance of the electric vehicle.

SUMMARY

The present disclosure provides mechanisms and approaches for improving operational efficiencies of an electric motor, an electric generator, or any other device that transforms mechanical motion to electrical energy or vice versa. The present disclosure also contemplates a vehicle that is moved under operation of one or more electric motors having the improved operational efficiencies described herein. In some examples, an electric motor is provided with one or more moving elements (e.g., rotational components) in a vacuum chamber. The vacuum chamber can be created with relatively low power requirements and inputs but can help create significant performance improvements in the electric motor. Specifically, if the rotational components of the electric motor are allowed to operate in a vacuum chamber (e.g., in an absence of air turbulence, in an absence of air resistance, etc.) or similar environment that creates less drag for the rotational components than an environment outside the vacuum chamber. Alternatively or additionally, the motor housing itself may be vacuum sealed (or may have been built in a vacuum chamber then sealed), meaning that no substantial additional energy is needed to maintain the vacuum as long as the appropriate seals are maintained around the motor housing.

The vacuum chamber may be created around an entirety of all components of the electric motor. In other embodiments, the vacuum chamber may be created around some, but not all, components of the electric motor. As an example, the vacuum chamber may be created within a housing of the electric motor, but may contain one or more rotational components of the electric motor. It should be appreciated that the conditions created within the vacuum chamber may correspond to a complete vacuum (e.g., an environment where substantially all air/fluid has been removed from the chamber with a pump) or partial vacuum (e.g., an environment where some, but not all, air/fluid has been removed from the chamber with a pump). It should also be appreciated that the vacuum chamber may be created and/or maintained with one or more physical seals and by actively withdrawing more air/fluid from the chamber with the pump. In other words, an amount of air/fluid in the vacuum chamber may be adjusted over time depending upon operations of the motor and desired conditions for the rotational components.

In some embodiments, a system is disclosed to include one or more components of a motor, which are provided in a vacuum chamber. The vacuum chamber may be created and/or maintained using a pump. The one or more components provided in the vacuum chamber may correspond to movable components, such as rotational components. The motor may correspond to an electric motor. As a non-limiting example, the motor may correspond to an induction motor, a synchronous motor, or a linear motor. As more specific but non-limiting examples, the motor may correspond to an AC brushless motor, a DC brushed motor, a DC brushless motor, a direct drive motor, a servo motor, a gear motor, or a stepper motor.

According to another embodiment of the present disclosure, a vehicle is provided that includes: a vacuum chamber and rotational components of an electric motor housed within the vacuum chamber, where the rotational components are controlled by electrical components of the electric motor, which receive electrical power from a power supply. The power supply may be provided external to the vacuum chamber. The rotational components may be coupled to a movable object (e.g., a wheel or gears of the vehicle), which when moved or rotated impart a motion to the vehicle.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. Various changes may be made in the function and arrangement of elements without departing from the spirit and scope of the appended claims.

Various examples are provided throughout the following disclosure. The disclosure of examples is in all cases intended to be non-limiting, including specifically when examples are identified with the terms or phrases identifying what follows to be an example, including the terms of phrases "for example," "as one example," "such as," "by way of example," and "e.g." In other words, the disclosure of one or more examples is not intended to limit the present disclosure to embodiments conforming to the disclosed example(s).

Embodiments of vehicles disclosed herein may include any number of features. While various examples of vehicles and components of vehicles will be described with particular features, it should be appreciated that the features depicted and described in connection with a particular vehicle may be used in any type of vehicle without departing from the scope of the present disclosure. In particular, embodiments of the present disclosure may be utilized in a vehicle as described in U.S. Pat. Nos. 11,040,747 and/or 9,457,648, the contents of each of which are hereby incorporated herein by reference in their entirety.

Figure 1:
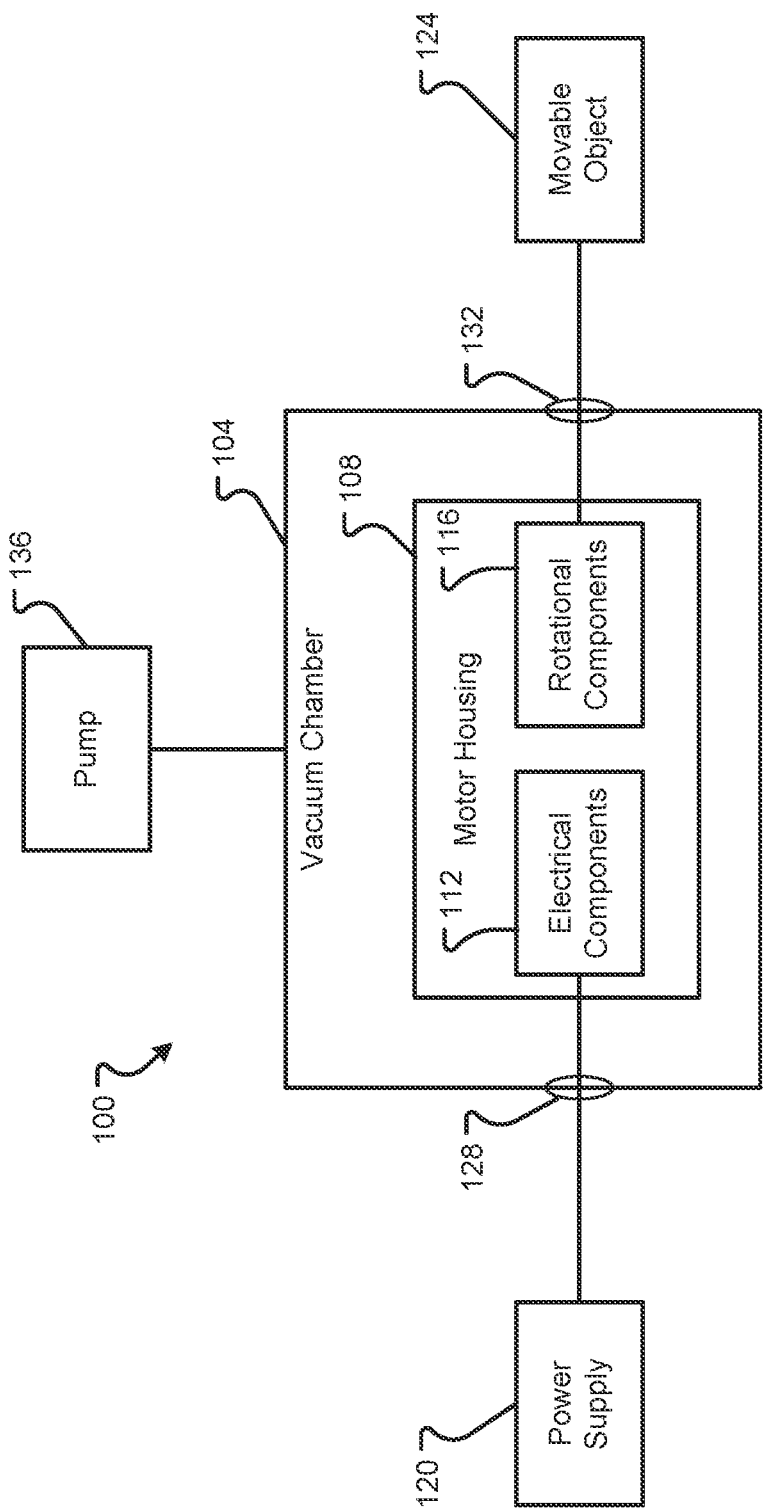
FIG. 1 is a block diagram showing vehicle components in a first configuration in accordance with at least some embodiments of the present disclosure.

Referring now to FIG. 1, a system 100 for use in a vehicle is shown and will now be described in accordance with at least some embodiments of the present disclosure. The system 100 may include one or more motors that are designed to operate under control of a motor controller, utilize electrical power from a power supply 120, and impart motion to one or more movable objects 124.

One, some, or all of the components of the system 100 may be provided in a wheel of the vehicle. Alternatively, the movable object 124 may correspond to a wheel of the vehicle, the motor may be provided in the wheel of the vehicle, and the power supply 120 used to provide power to the motor may be provided in the wheel of the vehicle or external to the wheel of the vehicle. Some or all of these components (e.g., the vacuum chamber 104, motor housing 108, electrical components 112, rotational components 116, power supply 120, and pump 136 may be positioned below an axis of rotation of the wheel to provide a lower center of gravity for the vehicle.

FIG. 1 also illustrates specific components of a motor, which may include a motor housing 108, electrical components 112, and movable components (e.g., rotational components 116). Some or all of the motor components including the motor housing 108 and all contents maintained therein may be provided in a vacuum chamber 104. The vacuum chamber 104 may correspond to a sealable or sealed container or enclosure. Air and/or fluid may be removed from the volume of the vacuum chamber 104 to create a complete or partial vacuum within the volume of the vacuum chamber 104. In some embodiments, a pump 136 may be used to remove air and/or fluid from the vacuum chamber 104 (e.g., to create the partial or complete vacuum environment within the vacuum chamber 104). In some embodiments, the pump 136 may be operated by a pump controller, which is configured to monitor a pressure within the vacuum chamber 104 and determine when the pump 136 should be activated to remove more air/fluid from the vacuum chamber 104. Once a suitable or desired partial or complete vacuum is created in the vacuum chamber 104, the pump 136 may be disabled to preserve energy.

One or more seals 128, 132 may be used to mechanically maintain the partial or complete vacuum within the vacuum chamber 104. In some embodiments, a first seal 128 is used to provide a sealable or sealed pathway for electrical wiring to pass between the power supply 120 and the electrical components 112. A second seal 132 is used to provide a sealable or sealed pathway for a mechanical coupling between the rotational components 116 and the movable object 124. In some embodiments, each seal 128, 132 may include an opening having a conformable material within the opening. The conformable material (e.g., silicone, plastic, rubber, etc.) may substantially preserve the vacuum conditions within the vacuum chamber 104 while also allowing a physical structure (e.g., wires or a mechanical coupling) to pass into/out of the vacuum chamber 104. It should be appreciated that one or both of the seals 128, 132 may comprise multiple, staged seals. For instance, the first seal 128 or the second seal 132 may be constructed of multiple seals positioned between an interior of the vacuum chamber 104 and the exterior of the vacuum chamber. Providing the vacuum chamber 104 with multiple staged seals may allow for one of the multiple seals to fail, crack, or become inoperable without sacrificing the vacuum chamber 104. It is also possible to provide one or both of the seals 128, 132 as a single seal device.

The electrical components 112 of the motor may include a motor controller, stator, stator coil(s), rotor, rotor coil(s), magnets, and/or any other motor components that operates with the assistance of electrical and/or electromagnetic energy. The electrical components 112 of the motor may consume electrical energy from the power supply 120, which may include a battery, a set of batteries, a power adapter, combinations thereof, or the like. While the power supply 120 is depicted as being connected to electrical components 112 with one or more physical wires that pass through the first seal 128, it should be appreciated that power could be provided to the electrical components from the power supply 120 using wireless power transfer approaches (e.g., induction, capacitance, etc.). In such a configuration it may be possible to transfer power from the power supply 120 to the electrical components 112 without requiring a wire that passes through the first seal 128 (e.g., the first seal 128 may be permanently shut or may not be necessary).

Activation or operation of the electrical components 112 may cause the rotational components 116 to rotate or move. In some embodiments, the rotational components 116 may include one or more of a motor shaft, a bearing, a rotor, a stator, a commutator, gears, combinations thereof, or the like. When electrical current is passed through one or more of the electrical components, then electric and/or electromagnetic forces may cause the rotational components 116 to move as is known in the electric motor arts.

Motion of the rotational components 116 may be transferred to the movable object 124 via one or more mechanical couplings that pass through the second seal 132. In some embodiments, the movable object 124 may include a wheel or gears connected to a wheel that cause the wheel to rotate, thereby causing a vehicle on which the wheel is mounted to move. Because the rotational components 116 are shown as being provided in a vacuum chamber 104, it should be appreciated that frictional forces (e.g., drag, turbulence, etc.) on the rotational components 116 can be reduced. Reducing the frictional forces on the rotational components 116 can help to improve the overall performance of the motor as compared to a motor that is not contained within a vacuum chamber 104.

Figure 2:
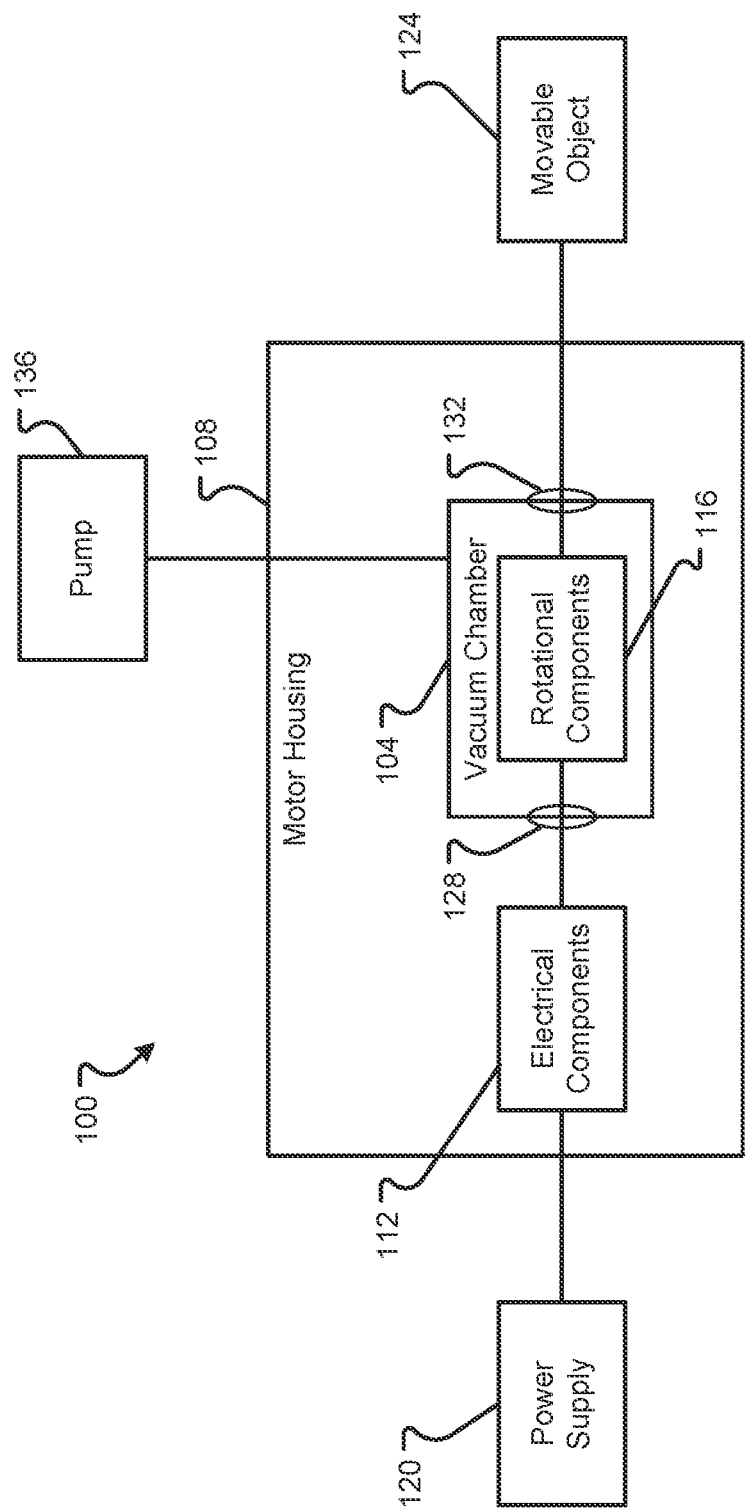
FIG. 2 is a block diagram showing vehicle components in a second configuration in accordance with at least some embodiments of the present disclosure.

FIG. 2 illustrates an alternative configuration of the system 100 in which the vacuum chamber 104 is provided within the motor housing 108. In this particular configuration, the vacuum chamber 104 is localized within the motor housing 108 such that the rotational components 116 are still capable of operating in a reduced friction environment, but other components of the motor (e.g., certain electrical components 112) can be maintained outside the vacuum chamber 104. Providing the electrical components 112 outside the vacuum chamber 104 may enable a smaller overall motor to be used. Moreover, certain features of the vacuum chamber 104 (e.g., the rotational components 116 and/or seals 128, 132) may be maintained in a more secure and safe area of the motor housing rather than exposing the entire vacuum chamber 104 outside the motor housing 108, which may help to preserve the complete or partial vacuum within the vacuum chamber 104.

Figure 3:
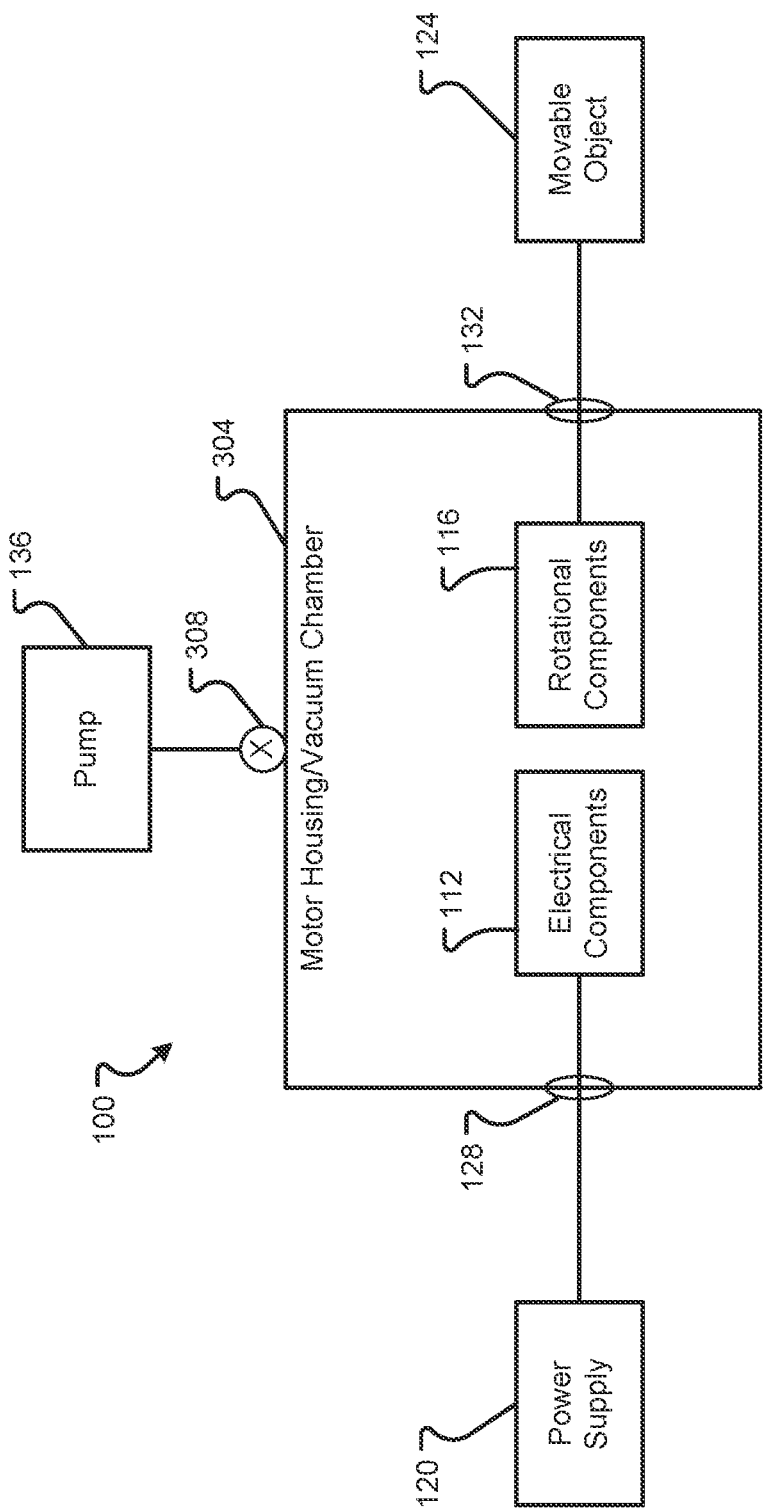
FIG. 3 is a block diagram showing a motor housing that acts as the vacuum chamber in accordance with at least some embodiments of the present disclosure.

FIG. 3 illustrates yet another configuration of the system 100 in which the motor housing is also the vacuum chamber 304. The combined housing/vacuum chamber 304 may still include one or more seals 128, 132 as described above. FIG. 3 also illustrates that a valve 308 may be used to provide a connection mechanism between the pump 136 and the housing/vacuum chamber 304. It should be appreciated that the valve 308 can be moved between an open and closed position such that, in the open position, the pump 136 can move air/fluid into or out of the housing/vacuum chamber. When the valve 308 is in a closed position, yet another seal may be formed on the housing/vacuum chamber 304 thereby preserving the pressure difference between the interior and exterior of the housing/vacuum chamber 304.

While the valve 308 is depicted in FIG. 3, but not in FIG. 1 or 2, it should be appreciated that the configuration of the system 100 shown in FIGS. 1 and/or 2 may include a valve 308 without departing from the scope of the present disclosure. For example, the valve 308 may be positioned between the pump 136 and the vacuum chamber 104. In some embodiments, the valve 308 may be provided as part of the vacuum chamber 104. In some embodiments, the pump 136 may be releasable connectable to the valve 308, meaning that the motor components do not necessarily have to operate with the pump 136 connected to the vacuum chamber. Rather, the pump 136 can be detached and reattached when needed to adjust the fluid/air pressure in the vacuum chamber, but the pump 136 can be removed from the system 100 when the pump 136 is not needed to adjust the fluid/air pressure in the vacuum chamber.

Figure 4:
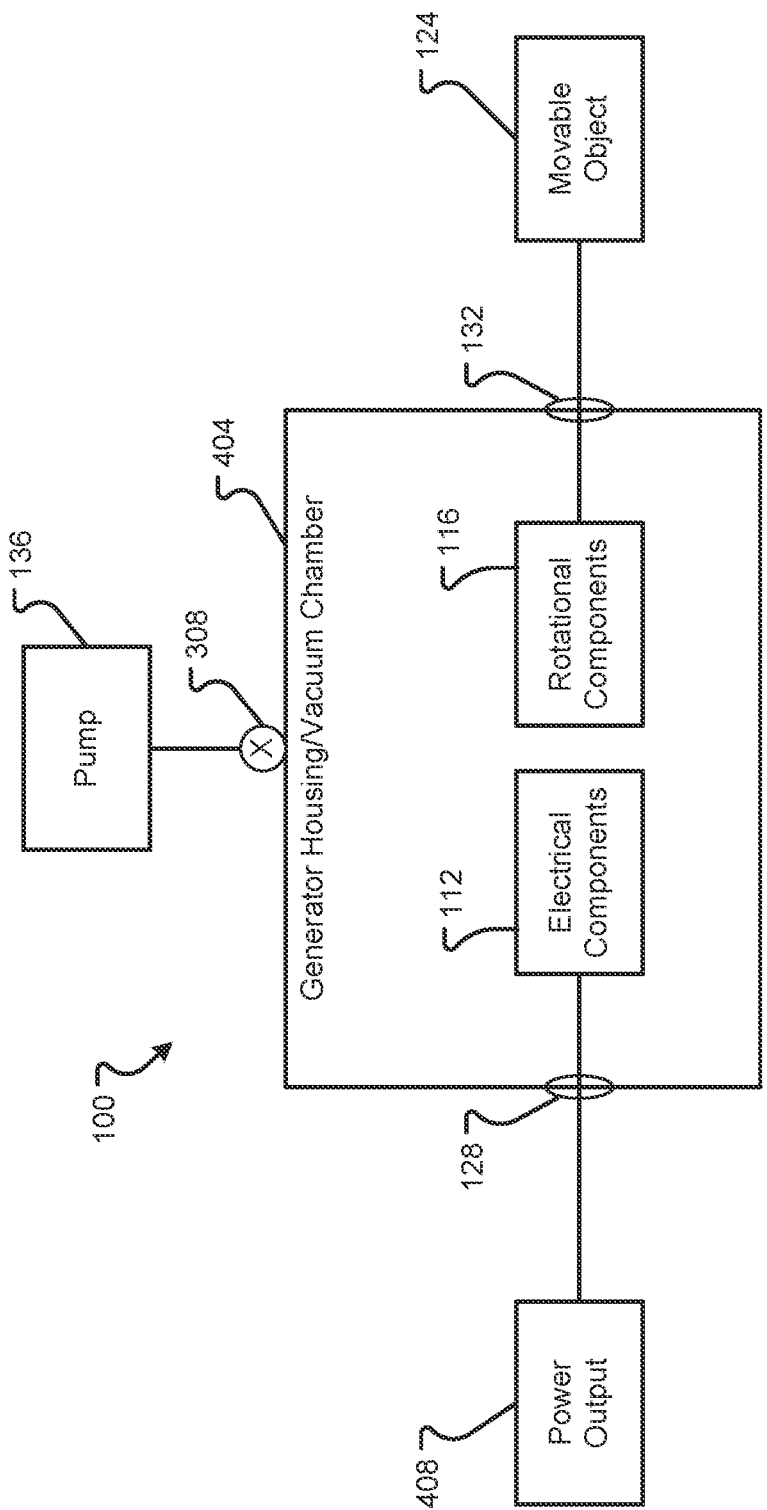
FIG. 4 is a block diagram showing a generator with components in a vacuum chamber in accordance with at least some embodiments of the present disclosure.

FIG. 4 illustrated yet another configuration of the system 100 where components of a generator are maintained in a vacuum chamber 404. In other words, embodiments of the present disclosure are not limited to use in motors, but can also be applied to generators and other articles of manufacture that include electrical components and components that move (e.g., rotate). The generator housing may also act as the vacuum chamber 404, meaning that the housing of the generator can have the vacuum conditions maintained therein. Unlike the motor, however, the generator 404 is used to provide power from the electrical components 112 to a power output 408, which may connect to a power grid or some other power sink. Also like the motor, the generator housing may be a vacuum chamber 404, meaning the generator housing doubles as a vacuum chamber. It should be appreciated that the vacuum conditions within the generator housing may be created with the pump 136 after the housing is constructed or the housing may be constructed under vacuum conditions and then distributed for use.

Various vehicle configurations that utilize a system 100 as described herein may include a four-wheel embodiment. It should be appreciated that a vehicle may be configured to support any number of wheels (e.g., 1, 2, 3, 4, 5, . . . , 10, etc.) without departing from the scope of the present disclosure and the vehicle may include one or many motors contained within a vacuum chamber 104 without departing from the scope of the present disclosure.

Specific details were given in the description to provide a thorough understanding of the embodiments. However, it will be understood by one of ordinary skill in the art that the embodiments may be practiced without these specific details. Additionally, the Figures do not depict well-known features that may be needed to create a working vehicle so as not to obscure the embodiments in unnecessary detail.

What is claimed is:

1. A system, comprising:
    a vacuum chamber;
    one or more components of a motor or generator, wherein the one or more components of the motor or generator are provided in the vacuum chamber; and
    a valve that provides a releasable connection mechanism for a pump to connect with and create the vacuum chamber.

2. The system of claim 1, wherein vacuum chamber is created and/or maintained using the pump.

3. The system of claim 1, wherein the one or more components of the motor or generator comprise movable components.

4. The system of claim 3, wherein the one or more components of the motor or generator comprise rotational components.

5. The system of claim 1, where the motor comprises an electric motor, wherein the electric motor comprises an induction motor, a synchronous motor, or a linear motor.

6. The system of claim 5, wherein the electric motor comprises an AC brushless motor, a DC brushed motor, a DC brushless motor, a direct drive motor, a servo motor, a gear motor, or a stepper motor.

7. The system of claim 1, wherein the one or more components comprise electrical components.

8. The system of claim 1, further comprising:
    a movable object coupled with the one or more components via a mechanical coupling, wherein the mechanical coupling passes through a seal of the vacuum chamber.

9. The system of claim 1, further comprising:
    a power supply coupled with the one or more components, wherein the power supply is coupled with the one or more components via a wire that passes through a seal of the vacuum chamber.

10. The system of claim 1, further comprising:
    a power output coupled with the one or more components.

11. A vehicle, comprising:
    a vacuum chamber;
    rotational components of an electric motor housed within the vacuum chamber, wherein the rotational components are controlled by electrical components of the electric motor, which receive electrical power from a power supply; and
    a valve that provides access to the vacuum chamber and is configured to releasably connect a pump to the vacuum chamber.

12. The vehicle of claim 11, wherein the power supply is provided external to the vacuum chamber.

13. The vehicle of claim 12, wherein the electrical components are provided external to the vacuum chamber.

14. The vehicle of claim 12, wherein the electrical components are provided within the vacuum chamber and are coupled with the power supply via a wire.

15. The vehicle of claim 11, wherein the power supply comprises a battery.

16. The vehicle of claim 11, further comprising:
    a wheel in which the vacuum chamber and the electric motor are provided, wherein one or both of the vacuum chamber and the electric motor are provided below an axis of rotation of the wheel.

17. The vehicle of claim 11, wherein the pump is used to create a partial or complete vacuum within the vacuum chamber while the rotational components are moved, wherein a seal is provided in the vacuum chamber that maintains the partial or complete vacuum while simultaneously allowing motion of the rotational components to be transferred to a movable object and wherein motion of the movable object is used to impart motion to the vehicle.

18. A generator, comprising:
- a housing configured to enclose one or more rotational components;
- a vacuum chamber established around the one or more rotational components that enables the one or more rotational components to move under conditions of decreased friction as compared components not contained in the vacuum chamber; and
- a valve that is provided as part of the housing and is configured to maintain the vacuum chamber.

19. The generator of claim 18, wherein the housing forms the vacuum chamber.

20. The generator of claim 18, wherein the valve provides a releasable connection mechanism for a pump to enable the pump to create the vacuum chamber and wherein the valve is movable between an open state and a closed state.

* * * * *